(12) United States Patent
Molteni

(10) Patent No.: US 9,375,727 B2
(45) Date of Patent: Jun. 28, 2016

(54) DRUM FOR MAGNETIC SEPARATOR AND RELEVANT PRODUCTION METHOD

(71) Applicant: SGM Gantry S.p.A., Manerbio BS (IT)

(72) Inventor: Danilo Molteni, Manerbio BS (IT)

(73) Assignee: SGM GANTRY S.P.A., Manerbio (BS) (IT)

( * ) Notice: Subject to any disclaimer, the term of this patent is extended or adjusted under 35 U.S.C. 154(b) by 0 days.

(21) Appl. No.: 14/438,938

(22) PCT Filed: Oct. 29, 2013

(86) PCT No.: PCT/IB2013/059749
§ 371 (c)(1),
(2) Date: Apr. 28, 2015

(87) PCT Pub. No.: WO2014/072880
PCT Pub. Date: May 15, 2014

(65) Prior Publication Data
US 2015/0336108 A1 Nov. 26, 2015

(30) Foreign Application Priority Data
Nov. 8, 2012 (IT) .......................... MI2012A001901

(51) Int. Cl.
*B03C 1/00* (2006.01)
*B03C 1/14* (2006.01)
(Continued)

(52) U.S. Cl.
CPC ............... *B03C 1/14* (2013.01); *F16C 33/4605* (2013.01); *F16C 43/065* (2013.01); *B03C 2201/20* (2013.01); *Y10T 29/49682* (2015.01); *Y10T 29/49693* (2015.01)

(58) Field of Classification Search
CPC ................ B03C 1/10; B03C 1/14; B07B 1/22
USPC ............... 209/214, 215, 223.1, 288, 289, 290
See application file for complete search history.

(56) References Cited

U.S. PATENT DOCUMENTS 3,146,191 A * 8/1964 Greenwald ............... B03C 1/14
                                                   209/223.1
3,312,530 A * 4/1967 Sackett ...................... B01J 2/20
                                                   100/98 R (Continued)

FOREIGN PATENT DOCUMENTS

DE  1433172 A1   1/1970
EP  0687504 A1   6/1995
WO  01/94868 A1  12/2001

OTHER PUBLICATIONS

International Search Report dated Apr. 2, 2014 for PCT/IB2013/059749.

*Primary Examiner* — Terrell Matthews
(74) *Attorney, Agent, or Firm* — Lucas & Mercanti, LLP

(57) ABSTRACT

In a drum for magnetic separator comprising a cylinder (C) of ferromagnetic material on the outside of which there are formed a plurality of longitudinal grooves (6) housing permanent magnets (7) arranged in longitudinal rows along a magnetic arc of 130°-160° with alternate N-S polarity, the cylinder (C) being located within a shell (M) of nonmagnetic material, the length (D) of the single dipole of the magnetic circuit is comprised in a range between 100 and 150 mm so as to provide a substantially homogeneous magnetic field along the whole magnetic arc, thanks to the limited length (D) of the dipole which results in a sinusoidal pattern of very limited amplitude and therefore with nominal values of the magnetic field that are present over almost 100% of the magnetic arc.

13 Claims, 3 Drawing Sheets

(51) Int. Cl.
*F16C 33/46* (2006.01)
*F16C 43/06* (2006.01)

(56) References Cited

U.S. PATENT DOCUMENTS

| | | | | |
|---|---|---|---|---|
| 3,489,280 A * | 1/1970 | Merwin | ............... | B03C 1/14 209/223.1 |
| 3,595,391 A * | 7/1971 | Schmid | ............... | B03C 1/14 209/152 |
| 4,693,812 A * | 9/1987 | Bond | ............... | B03C 1/14 209/224 |
| 4,869,811 A * | 9/1989 | Wolanski | ............... | B03C 1/12 209/212 |
| 5,496,470 A * | 3/1996 | Lenhart | ............... | B03C 1/12 210/222 |
| 5,636,748 A * | 6/1997 | Arvidson | ............... | B03C 1/12 209/213 |
| 5,938,579 A * | 8/1999 | Cavazos | ............... | B03C 1/12 492/36 |
| 6,062,393 A * | 5/2000 | Knoll | ............... | B03C 1/14 209/11 |
| 6,634,504 B2 * | 10/2003 | Robinson | ............... | B03C 1/00 209/214 |
| 7,918,345 B2 * | 4/2011 | Molteni | ............... | B03C 1/14 209/215 |
| 8,196,751 B2 * | 6/2012 | Shuttleworth | ............... | B03C 1/12 209/214 |
| 2015/0290656 A1 * | 10/2015 | Molteni | ............... | B03C 1/0335 209/219 |
| 2015/0336108 A1 * | 11/2015 | Molteni | ............... | B03C 1/14 209/219 |

\* cited by examiner

DRUM FOR MAGNETIC SEPARATOR AND RELEVANT PRODUCTION METHOD

CROSS-REFERENCE TO RELATED APPLICATIONS

This application is a 371 of PCT/IB2013/059749, filed Oct. 29, 2013 which, in turn, claimed the priority of Italian Patent Application No. MI2012A001901 filed on Nov. 8, 2012, both applications are incorporated herein by reference.

FIELD OF THE INVENTION

The present invention relates to magnetic separators, and in particular to a drum for a medium intensity magnetic separator and to a method for producing such a drum.

BACKGROUND OF THE INVENTION

It is known that a medium intensity magnetic separator (MIMS) is designed to attract and remove ferromagnetic material by means of a drum that generates a magnetic induction in a range of about 200-700 mT depending on the distance from the drum and the magnets employed, which are usually made of a neodymium-iron-boron alloy (Nd—Fe—B).

A MIMS can be used as a protection device for a wet high intensity magnetic separator (WHIMS), or as an autonomous magnetic separator for the concentration of metalliferous minerals with low magnetic susceptibility such as franklinite, ilmenite, some type of hematite, etc.

The conventional structure of a MIMS drum provides for a cylinder of ferromagnetic steel with high magnetic permeability on the outside of which longitudinal grooves are formed to house permanent magnets arranged in longitudinal rows of alternate N-S polarity, i.e. each row includes a single polarity that is different from those of the two adjacent rows (e.g. U.S. Pat. No. 5,636,748). These rows of magnets extend over a limited arc of the drum, typically about 130°-160°, with a final zone (in the direction of rotation of drum) for releasing the ferromagnetic material in which the magnets are progressively tapered to be farther from the external surface of the cylinder. The cylinder is then enclosed by a shell of non-magnetic material that rotates around it drawing the material (mineral or else) containing the ferromagnetic particles to be separated.

The size of the magnets used in prior art drums is quite large and usually increases with the drum diameter, whereby the number of longitudinal rows arranged along the magnetic arc is rather limited and the distance between the cylinder and the shell cannot drop below a given threshold taking into account the drum manufacturing tolerances and the size of the magnets. These geometrical characteristics of known drums negatively affect their performance due to two kinds of drawbacks.

A first serious drawback stems from the fact that since the different polarities are rather far from each other the length of the magnetic dipole (equal to the distance between two polarities with the same sign) results quite great, with values in the order of 200-400 mm like in the case of MIMS marketed by Mineral Technologies Pty. Ltd. (Carrara, Qld—Australia) and by Longi Magnet Co. Ltd. (Fushun—China). As a consequence, the values of the magnetic field on the active surface of the MIMS have a strongly sinusoidal pattern, with nominal values only at the polarities and close thereto (therefore over not more than 30% of the magnetic arc) whereas in the rest of the magnetic arc the values are significantly lower.

A second drawback that further reduces the effectiveness of known drums is the play between the cylinder and the shell which in the above-mentioned MIMS available on the market is of at least 5 mm, to which the shell thickness ranging between 1.5 and 5 mm must be added, whereby the minimum distance between the magnet active surface and the treated material is in the order of 7-8 mm.

SUMMARY OF THE INVENTION

Therefore the object of the present invention is to provide a MIMS drum which overcomes the above-mentioned drawbacks. This object is achieved by means of a drum in which the magnetic dipole length is comprised in the range from 100 to 150 mm thanks to the use of smaller magnets arranged in a higher number of longitudinal rows. Other advantageous features are disclosed in the dependent claims.

The main advantage of the drum according to the present invention is therefore that of providing a substantially homogeneous magnetic field along the whole magnetic arc, thanks to the limited length of the dipole which results in a sinusoidal pattern of very limited amplitude, and therefore with nominal values of the magnetic field that are present over almost 100% of the magnetic arc.

A second significant advantage of this drum stemming from the use of small magnets is the possibility or reducing the play between the cylinder and the shell to not more than 2 mm, also thanks to the relevant production method described in the following, without risking a drum seizure in particular in its preferred embodiment that provides internal ball supports as described in detail further on.

BRIEF DESCRIPTION OF THE DRAWINGS

These and other advantages and characteristics of the MIMS drum according to the present invention will be clear to those skilled in the art from the following detailed description of an embodiment thereof, with reference to the annexed drawings wherein.

DETAILED DESCRIPTION OF THE INVENTION

With reference to these figures, there is seen that a drum according to the present invention conventionally includes a cylinder C of ferromagnetic material with high magnetic permeability, preferably mild steel, having for example a diameter of 950 mm and a thickness of 35 mm, closed at its ends by two steel flanges 2. Two hubs 3, provided with seats for bearings 4 and locking clamps 5, are secured at the centre of flanges 2, along the longitudinal axis A-A of cylinder C. Moreover, an arm B for adjusting the position of the magnetic arc of the magnets-carrying cylinder C is secured to one of hubs 3.

Figure 1:
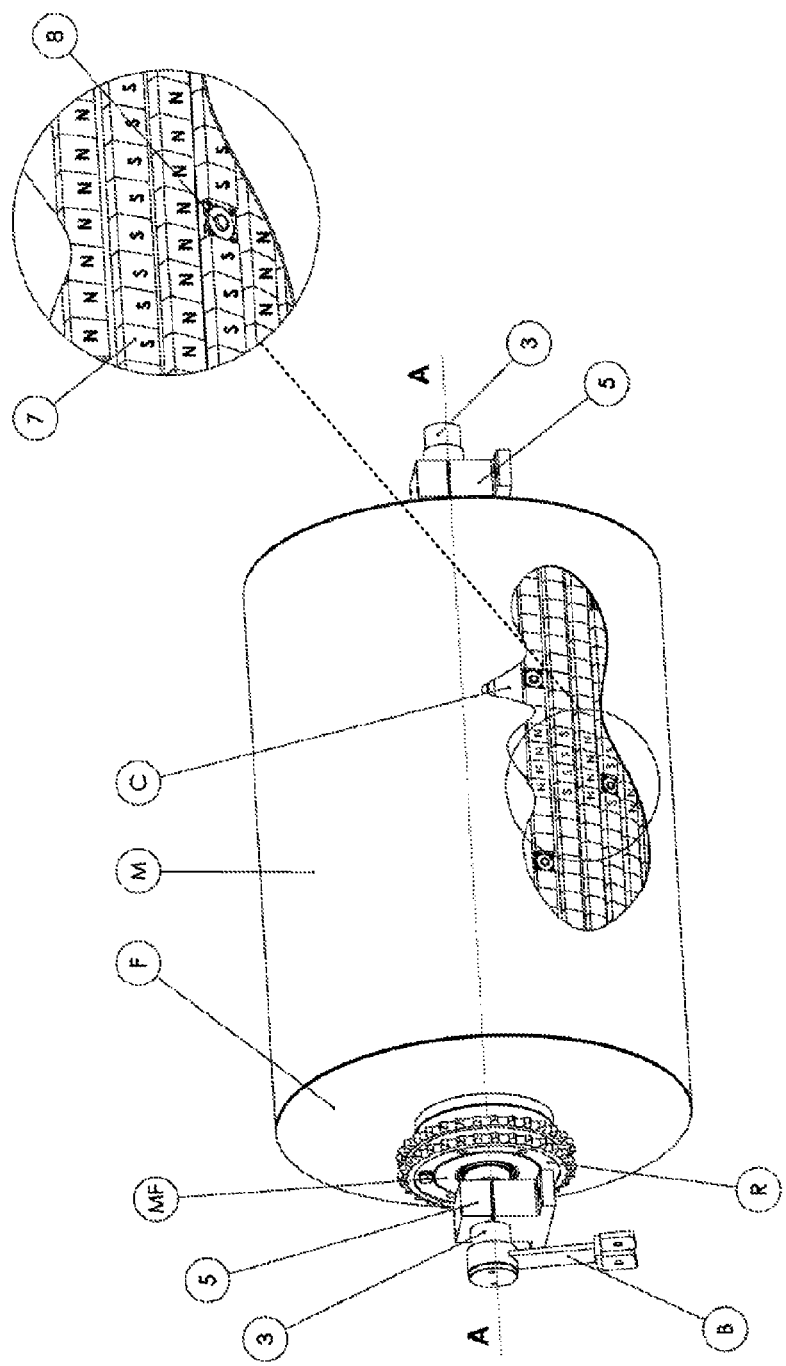
FIG. 1 is a perspective view of a drum with a see-through portion and an enlarged detail.
Figure 2:
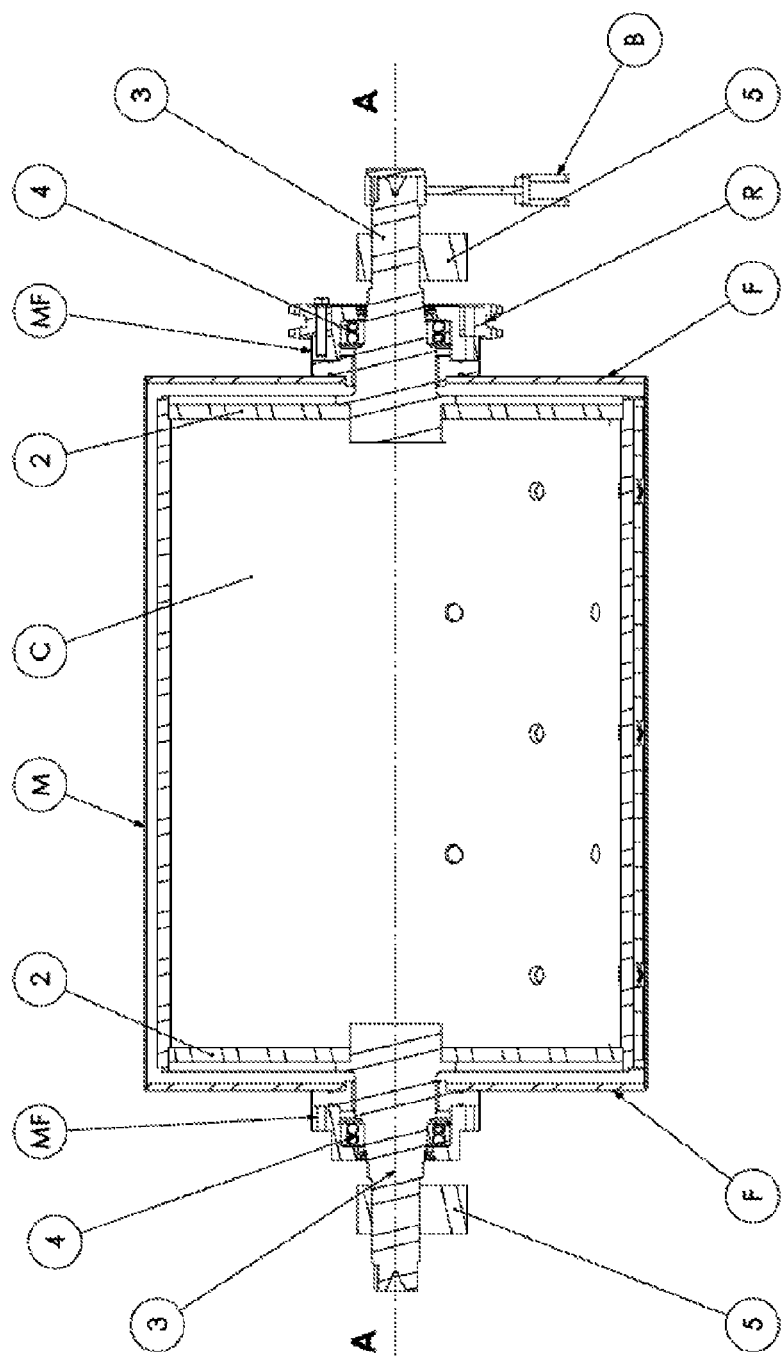
FIG. 2 is a longitudinal sectional view along a midplane including the rotation axis A-A.

A plurality of longitudinal grooves 6 are formed on the outside of cylinder C and house Nd—Fe—B permanent magnets 7 arranged in longitudinal rows with alternate N-S polarity (FIG. 1). Cylinder C is introduced in a shell M of non-magnetic material, for example AISI 316 stainless steel having a thickness Sm of 4 mm, closed at its ends by two flanges F (also of AISI 316) having flanged hubs MF provided with seats for bearings 4. At least one of hubs MF is also provided with means, for example a toothed gear R, for receiving from a motor (not shown) the motion to drive into rotation shell M.

Figure 3:
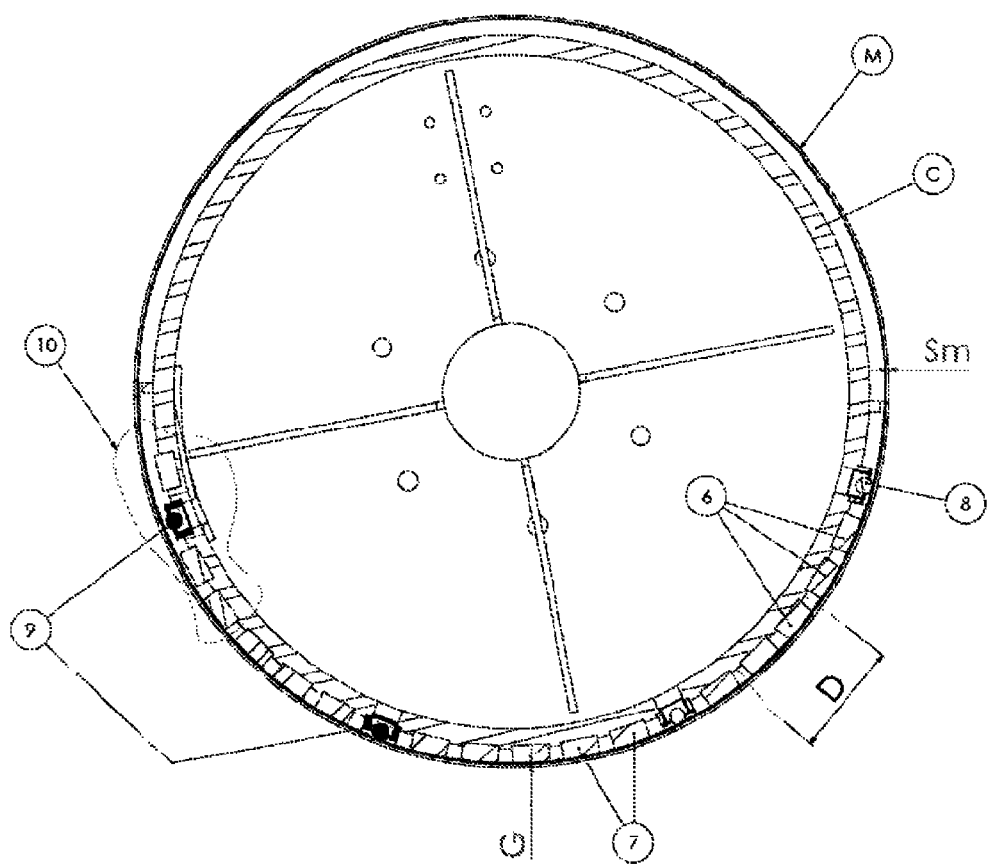
FIG. 3 is a cross-sectional view.

A first novel aspect of the present drum resides in the fact that the use of smaller magnets allows to achieve a length D of the single dipole of the magnetic circuit (FIG. 3) equal to 127 mm, and this in turn allows to obtain a higher number of alternate N-S longitudinal polarities which in the illustrated example are twenty along a magnetic arc of about 150°. More specifically, the attractive magnetic arc is made up of the first sixteen polarities and the material release zone 10 is made up of the last four polarities, the latter being housed in progressively deeper grooves.

It should be noted that the use of smaller magnets 7, combined with a cylinder C of adequate thickness, allows to achieve the progressive moving away of the magnets in the release zone 10 simply by forming deeper longitudinal grooves 6. This simplifies the manufacturing of the drum since it is not necessary to form tapered magnets, magnets 7 being all the same, whereas forming deeper grooves 6 is a much easier and cheaper working than tapering the magnets.

A second novel aspect of this drum, in its preferred embodiment, is given by the presence of a plurality of rotatable ball supports 8 arranged in a chequered pattern among magnets 7, in order to reduce to a minimum the play G between the active surface of the magnets and the internal surface of the non-magnetic shell M. The balls of supports 8 project by 0.3-0.4 mm with respect to the active surface of magnets 7 and allow to reduce the play G between said active surface and the internal surface of the non-magnetic shell M to a value not greater than 2 mm.

In fact, considering that the manufacturing tolerance of shell M is of ±1 mm, even in case of negative manufacturing tolerance that adds up with a deformation of shell M due to the attraction of the material towards the magnets, the possible sliding of the internal surface on the balls of supports 8 would not cause seizing of the drum since the balls turn the sliding friction into rolling friction acting as ball bearings.

The external surface of shell M is also preferably coated with a two-component epoxy paint that forms a high-friction layer, so as to improve the drawing of the ferromagnetic material attracted by magnets 7 and to reduce the wear of shell M. An example of a paint suitable for this purpose is Epidek M377 produced by Leighs Paints (Bolton—GB).

The method for producing the drum according to the present invention can be summarized in the following steps:

a) welding the closure flanges 2 at the ends of cylinder C;
b) fixing, for example by keying or welding, hubs 3 at the centre of flanges 2;
c) machining cylinder C on a lathe to achieve perfect coaxiality of hubs 3 with the outside of cylinder C and to form on hubs 3 the seats for bearings 4 and for the locking clamps 5;
d) milling the longitudinal grooves 6 and the seats for the ball supports 8 on the outside of cylinder C;
e) fixing magnets 7 into grooves 6 and easily removable plugs 9 (e.g. made of nylon or Teflon) into the seats for the ball supports 8;
f) covering the region of cylinder C where magnets 7 are present with a wrapper sealed with a putty suitable to allow the filling of said wrapper with an epoxy resin;
g) filling the wrapper with an epoxy resin and subsequently removing the wrapper upon hardening of the epoxy resin;
h) machining cylinder C on a lathe to perform the grinding at the desired diametral size of the surface covered with magnets 7 and of the interspaces filled with resin;
i) removing plugs 9 and fixing the ball supports 8;
j) introducing cylinder C inside shell M and sealingly mounting the closure flanges F.

It should be noted that due to the grinding in step h) the external surface of magnets 7 has the same curvature as cylinder C so as to be able to minimize play G, and this working is made possible by the fact that magnets 7 are buried in the epoxy resin in step g), otherwise they would be too fragile and they would break.

It is clear that the above-described and illustrated embodiment of the drum according to the invention is just an example susceptible of various modifications. In particular, various parameters such as the number of grooves 6, magnets 7 and supports 8, as well as the thickness of cylinder C and shell M, may vary depending on the size of the drum as long as length D of the magnetic dipole is kept within the range from 100 to 150 mm.

The invention claimed is:

1. Drum for magnetic separator comprising a cylinder (C) of ferromagnetic material closed at its ends by two flanges having central hubs provided with seats for bearings and locking clamps, said central hubs being arranged along the longitudinal axis (A-A) of said cylinder (C), a plurality of longitudinal grooves being formed on the outside of the cylinder (C) and housing permanent magnets arranged in longitudinal rows of a single polarity along a magnetic arc of about 130° to 160° with alternate N-S polarity between adjacent rows, the cylinder (C) being located within a shell (M) of non-magnetic material closed at its ends by two flanges (F) having flanged hubs (MF) provided with seats for said bearings, at least one of said flanged hubs (MF) being also provided with means for receiving from a motor the motion to drive into rotation said shell (M), wherein the length (D) of the single dipole of the magnetic circuit is in a range between 100 and 150 mm.

2. Drum according to claim 1, wherein the magnets are all identical and the magnets are housed in progressively deeper longitudinal grooves in a release zone at the end of the magnetic arc.

3. Drum according to claim 1, further comprising a plurality of rotatable ball supports arranged in a chequered pattern among the magnets, the balls of said supports projecting by 0.3-0.4 mm with respect to the active surface of the magnets.

4. Drum according to claim 3, wherein the play (G) between the active surface of the magnets and the internal surface of the shell (M) is ≤2 mm.

5. Drum according to claim 1, wherein the external surface of the shell (M) is coated with an epoxy paint that forms a high-friction layer.

6. Drum according to claim 1, wherein an arm (B) for adjusting the position of the magnetic arc of the cylinder (C) is secured to one of the hubs.

7. Drum according to claim 1, wherein the magnets are made of a Nd—Fe—B alloy.

8. Drum according to claim 1, wherein the shell (M) is made of AISI 316 stainless steel having a thickness (Sm) of 4 mm.

9. Method for producing a drum for magnetic separator according to claim 1, comprising:
a) welding the closure flanges at the ends of the cylinder (C);
b) fixing the hubs at the center of the flanges;
c) machining the cylinder (C) on a lathe to achieve perfect coaxiality of the hubs with the outside of the cylinder (C) and to form on the hubs the seats for the bearings and for the locking clamps;
d) milling the longitudinal grooves on the outside of the cylinder (C);

e) fixing the magnets into the grooves; and f) introducing the cylinder (C) inside the shell (M) and sealingly mounting the closure flanges (F) of the latter;

wherein in step d) the grooves are formed at a distance such that the length of the single dipole of the magnetic circuit is in a range between 100 and 150 mm.

10. Method according to claim 9, wherein in step d) there are also formed seats for ball supports (8) which are subsequently fixed in said seats so as to project by 0.3-0.4 mm with respect to the magnets.

11. Method according to claim 10, wherein in step e) there are also fixed easily removable plugs into the seats for the ball supports and further includes the following steps between steps e) and f):

e') covering the region of the cylinder (C) where the magnets are present with a wrapper sealed with a putty suitable to allow the filling of said wrapper with an epoxy resin;

e") filling the wrapper with an epoxy resin and subsequently removing the wrapper upon hardening of the epoxy resin;

e''') machining the cylinder (C) on a lathe to perform the grinding at the desired diametral size of the surface covered with magnets and of the interspaces filled with resin;

e'''') removing the plugs and fixing the ball supports.

12. The drum of claim 1, wherein the means for receiving from a motor the motion to drive into rotation said shell is a toothed wheel (R).

13. The drum of claim 1, wherein the length (D) of the single dipole of the magnetic circuit is 127 mm.

\* \* \* \* \*